United States Patent
Quiroz de la mora et al.

(10) Patent No.: US 9,939,641 B1
(45) Date of Patent: Apr. 10, 2018

(54) COMBINER HEAD-UP DISPLAY

(71) Applicant: Continental Automotive Systems, Inc., Auburn Hills, MI (US)

(72) Inventors: Luis Ernesto Quiroz de la mora, Tlaquepaque (MX); Johan Gomez Martinez, Zapopan (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/396,551

(22) Filed: Dec. 31, 2016

(51) Int. Cl.
*G02B 27/14* (2006.01)
*G02B 27/01* (2006.01)
*B60K 35/00* (2006.01)

(52) U.S. Cl.
CPC .......... *G02B 27/0149* (2013.01); *B60K 35/00* (2013.01); *G02B 27/0101* (2013.01); *B60K 2350/2052* (2013.01); *B60K 2350/921* (2013.01); *G02B 2027/0159* (2013.01)

(58) Field of Classification Search
CPC ............ G02B 27/0149; G02B 27/0101; G02B 2027/0159; B60K 35/00; B60K 2350/921; B60K 2350/2052
See application file for complete search history.

(56) References Cited

U.S. PATENT DOCUMENTS

| | | |
|---|---|---|
| 5,457,575 A | 10/1995 | Groves et al. |
| 8,749,890 B1 | 6/2014 | Wood et al. |
| 2009/0086329 A1* | 4/2009 | Potakowskyj ..... G02B 27/0149 359/630 |

* cited by examiner

*Primary Examiner* — Alicia M Harrington

(57) ABSTRACT

A combiner head-up display (HUD) system includes a combiner mirror and a combiner holder supporting the combiner mirror. The combiner holder includes first and second holder arms. The HUD system also includes a combiner HUD body supporting a first knob. The combiner HUD system includes an elevation link connecting the first knob and the first holder arm. A rotation of the first knob causes the combiner mirror to move from a stowed position to a display position or from a display position to a stowed position. A second knob is supported by the combiner HUD body and is disposed substantially opposite the first knob. A threaded rod connects the second knob and the second holder arm. When the combiner mirror is in the display position, a rotation of the second knob causes the combiner mirror to adjust a display angle between the fore-aft axis and the combiner mirror.

8 Claims, 9 Drawing Sheets

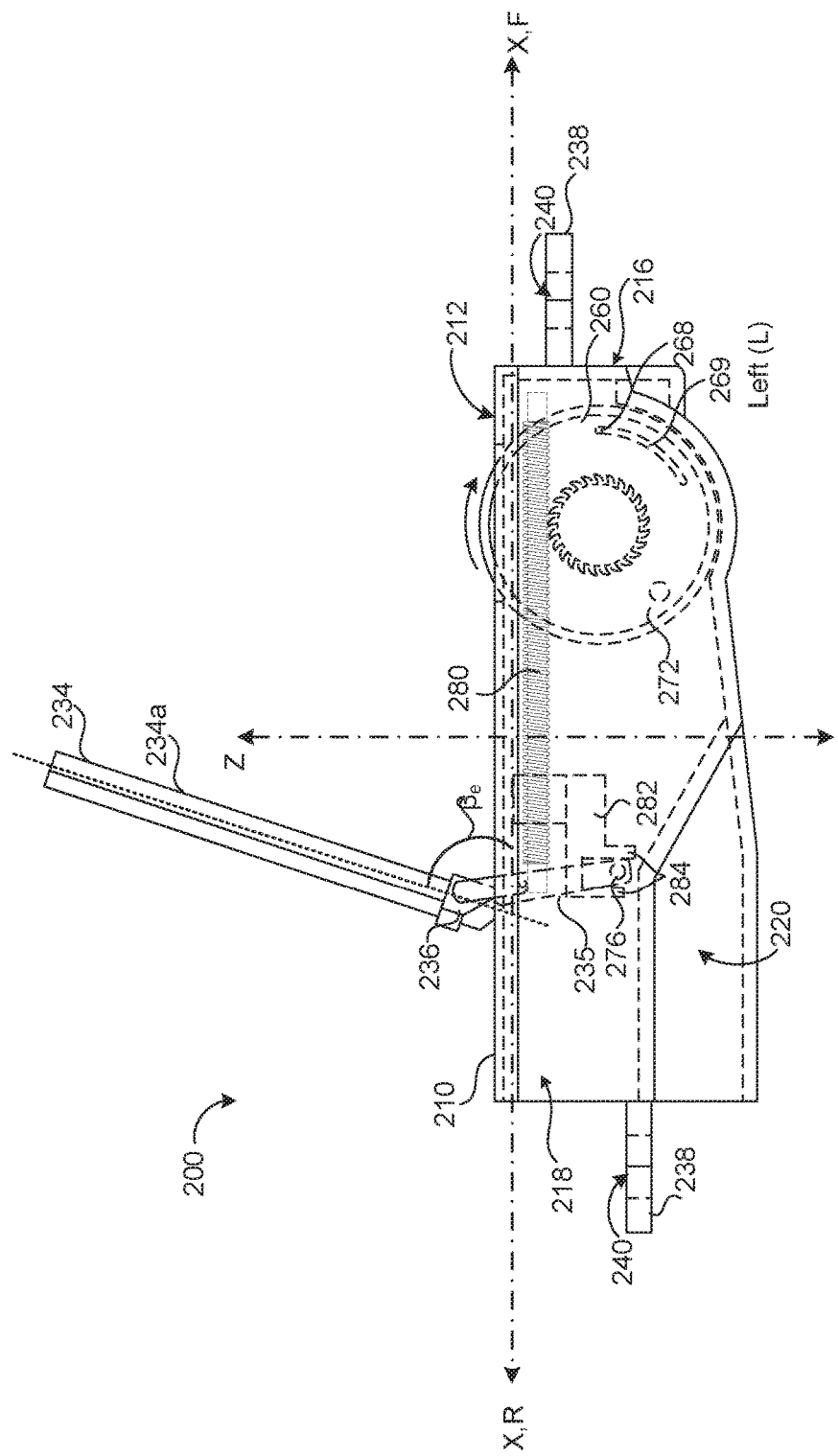

COMBINER HEAD-UP DISPLAY

TECHNICAL FIELD

This disclosure relates to a combiner head-up display (HUD) for an interior of a motor vehicle.

BACKGROUND

A head-up display or heads-up display (HUD) is a display that presents data to a user without requiring the user to look away from their usual forward viewpoint(s). The HUD presents information to the user directly in the line of sight of the user, reducing driver distractions. For example, HUDs are used in a vehicle to display information, such as, but not limited to, vehicle speed, speed limit information, and/or navigation information. As such, the user may maintain his head in an upright forward looking position to view the provided information, instead of angling his/her head down and looking at lower instruments (e.g., instrument cluster or secondary display). Therefore, the user's eyes do not have to accommodate between looking inside to a position having a closer distance then looking outside at the road having a further distance. In addition, the user does not need to refocus his view from looking at the lower instruments and then looking at the road.

In some examples, the HUD projects an image onto the windshield of a vehicle. However, based on the design of the windshield and the vehicle, in some examples, it may be difficult to design a HUD that is capable of projecting images on the windshield viewable by the driver due to constraints, for example, distance between the driver and the windshield, the position of the HUD with respect to the windshield, and/or the shape of the windshield. Therefore, it is desirable to have a HUD system configured to fit in any vehicle and provide a display image viewable to the driver regardless of the shape and size of the windshield.

SUMMARY

One aspect of the disclosure provides a combiner head-up display (HUD) system that includes a combiner mirror and a combiner holder configured to support the combiner mirror. The combiner holder includes a first holder arm and a second holder arm. The combiner HUD system also includes a combiner HUD body defining a fore-aft axis extending between a left portion and a right portion of the combiner HUD body. The combiner HUD system also includes a first knob supported by the combiner HUD body and an elevation link connecting the first knob and the first holder arm. A rotation of the first knob causes the combiner mirror to move from a stowed position to a display position or from a display position to a stowed position. The combiner HUD system also includes a second knob supported by the combiner HUD body and disposed substantially opposite the first knob about the fore-aft axis. Additionally, the combiner HUD system includes a threaded rod connecting the second knob and the second holder arm. When the combiner mirror is in the display position, a rotation of the second knob causes the combiner mirror to adjust a display angle between the fore-aft axis and the combiner mirror.

Implementations of the disclosure may include one or more of the following optional features. In some implementations, the combiner mirror includes an inner surface including a transparent plastic disc. In some examples, the first and second knobs each include a knurled outer surface.

In some implementations, the combiner HUD system includes a pin disposed at a distal end of the second holder arm. The combiner HUD system further including a fine positioning slider disposed at a distal end of the threaded rod. The fine positioning slider defines a U-shaped hook configured to receive the pin of the second holder arm when the combiner mirror is in the display position.

In some examples, the combiner HUD system includes a first restriction mechanism configured to restrict a motion of the first knob and a second restriction mechanism configured to restrict a motion of the second knob. In some examples, the first and/or second restriction mechanism may include a pin disposed at an inner side of the combiner HUD housing and a trough disposed on the first and/or second knob. In this example, the trough is configured to restrict the motion of the pin as it rotates with the first and/or second knob. In other examples, the first and/or second restriction mechanism includes a trough disposed at an inner side of the combiner HUD housing and a pin disposed on the first and/or second knob. In this example, the pin is configured to restrict the motion of the trough as it rotates with the first and/or second knob.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4B is a side view of the exemplary combiner HUD system in a stowed position including a fine tuning knob.

Like reference symbols in the various drawings indicate like elements.

DETAILED DESCRIPTION

Vehicles, such as motor vehicles that include motorcycles, cars, cross-overs, trucks, and buses, railed vehicles that include trains and trams, watercraft vehicles that include ships and boats, and aircrafts have various designs and shapes. In some examples, the vehicle includes a head-up display (HUD) system that helps a driver of the vehicle view information associated with the vehicle or environment of the vehicle while maintaining a field-of-view for driving the vehicle. As such, it is desirable to have a combiner HUD system 200 configured for installation in a dashboard of a vehicle with limited space and for installation in multiple vehicles having different specification (such as size, volume, and placement of different modules within the vehicle). As such, the combiner HUD system 200 is a flexible option for being installed in multiple vehicles having different specifications and being independent of the shape of the windshield.

Figure 1A:
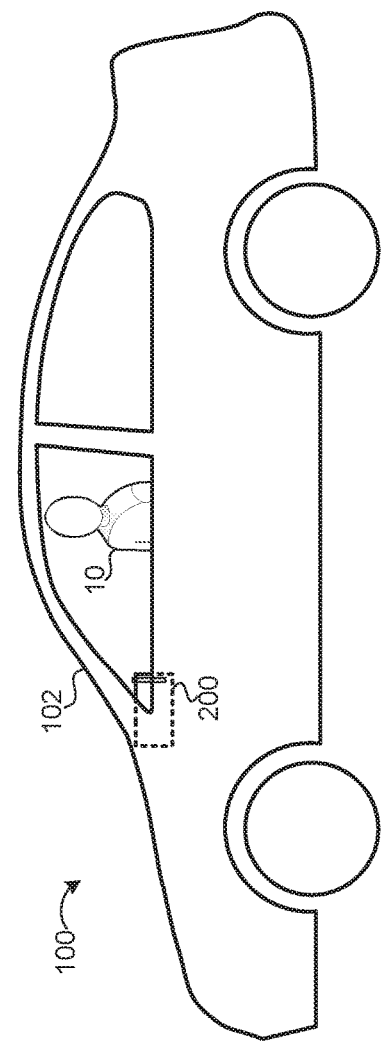
FIG. 1A is a schematic view of a vehicle including an exemplary combiner head-up display (HUD) system.
Figure 1B:
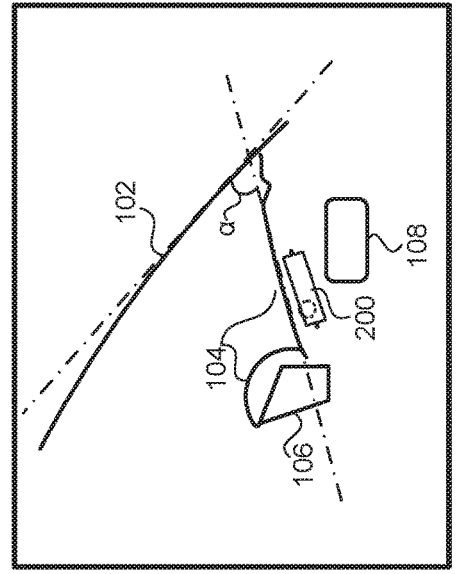
FIGS. 1B and 1C are schematic views of exemplary vehicles having different windshield angles with respect to a dashboard.
Figure 1C:
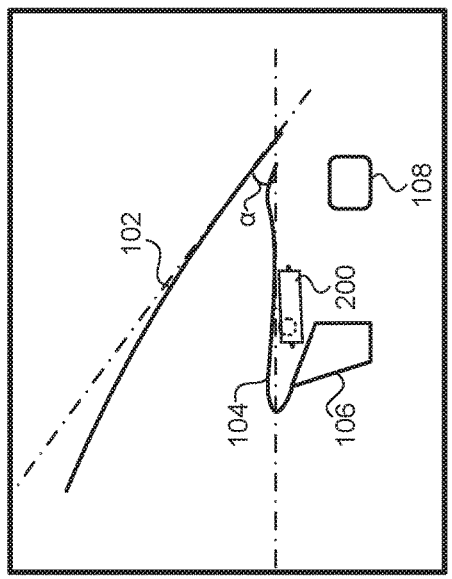

Referring to FIGS. 1A-1C, in some implementations, a vehicle 100 includes the combiner head-up display (HUD) system 200. As shown, the vehicle 100 is a car, but may be any other vehicle 100. The combiner HUD system 200 is a scalable solution that provides an alternative to an HUD system that reflects an image on the windshield 102 of the vehicle 100. The combiner HUD system 200 is a type of HUD that includes a display, such as a combiner mirror, that reflects the image instead of the windshield 102. As shown, the combiner HUD system 200 may be positioned in a dashboard 104 of a vehicle 100 between an instrument cluster 106 and a venting channel 108.

FIGS. 1B and 1C illustrate different vehicle configurations, having a windshield angle α between the windshield 102 and the dashboard 104. The windshield angle α may vary based on the design of the vehicle 100. For example, a sports vehicle may have a smaller windshield angle α compared to the windshield angle α of a sedan, which in turn may have a smaller windshield angle α compared to a windshield angle α of a sports utility vehicle (SUV) or a truck. As such, it is desirable that the combiner HUD system 200 is designed to be integrated in multiple vehicle configurations having a different cockpit size and a different windshield angle α. In addition to having the combiner HUD system 200 that is flexible for mounting in different configurations of cockpit, it is also desirable to have the combiner HUD system 200 that is adjustable by a driver 10 based on a driver's position.

Figure 2A:
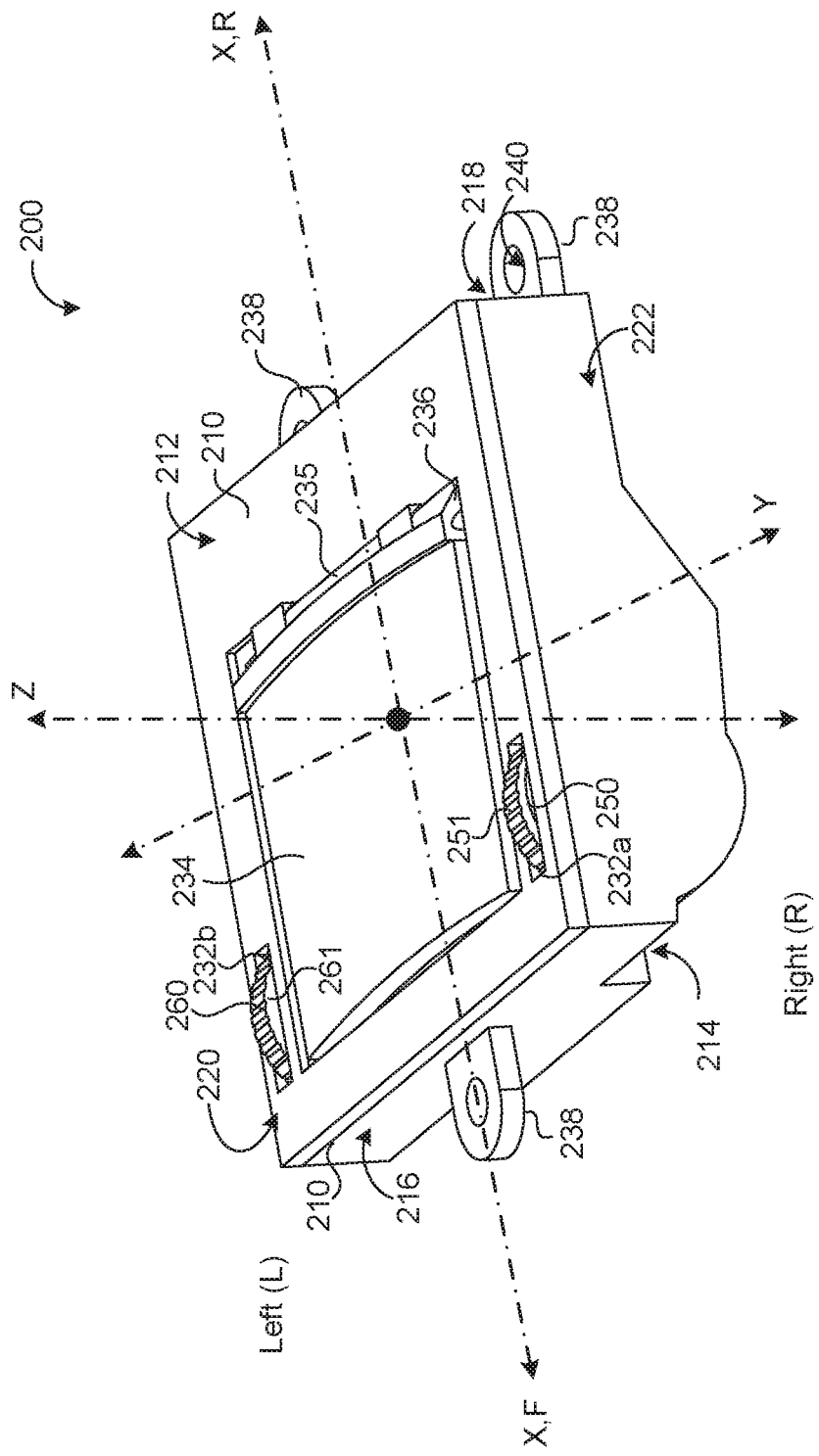
FIG. 2A is a perspective view of the exemplary combiner HUD system in a stowed position.
Figure 2B:
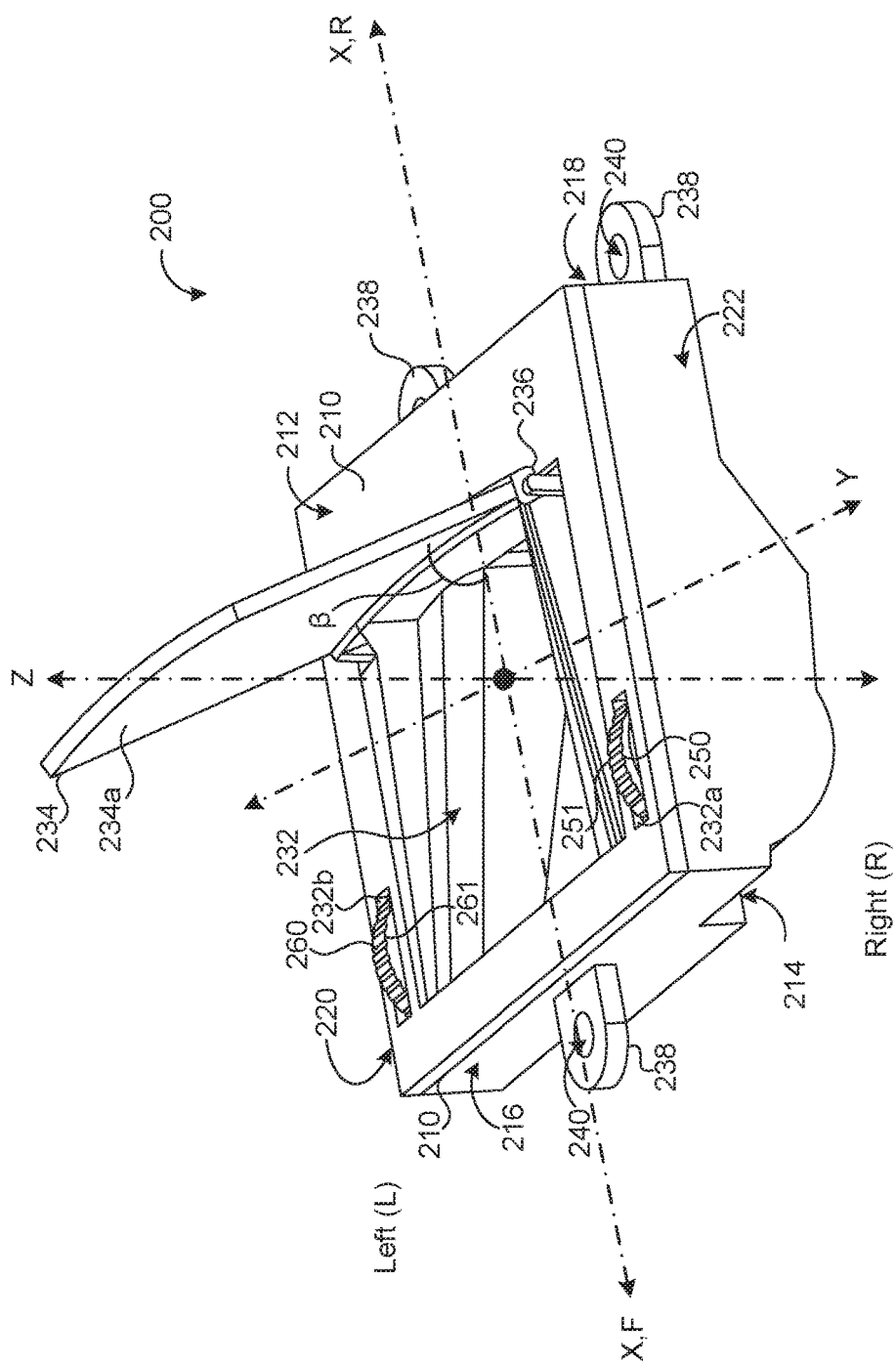
FIG. 2B is a perspective view of the exemplary combiner HUD system in a display position.

Referring to FIGS. 2A and 2B, the combiner HUD system 200 may be in a stowed position as shown in FIG. 2A or a deployed or display position as shown in FIG. 2B. The combiner HUD system 200 includes a combiner HUD body 210 defining a fore-aft axis X, a transverse axis Y, and a central vertical axis Z. The fore-aft axis X extends between a right portion R and a left portion L of the combiner HUD body 210.

The combiner HUD body 210 includes a top side 212 and a bottom side 214 opposite the top side 212, a front side 216 and a back side 218, and left and right side 220, 222 respectively. In some examples, the front side 216 and the back side 218 are substantially opposed along the transverse axis Y. In addition, the left side 220 and the right side 222 may be substantially opposed along the fore-aft axis X. The combiner HUD body 210 may have a substantially rectangular prism shape having six faces, i.e., sides 212-222, that are all substantially rectangles. However, the combiner HUD body 210 may have other shapes, including, but not limited to, a square prism, a spherical shape, a cuboid shape, or a combination thereof.

The top side 212 of the combiner HUD body 210 includes an upper cover 230 defining a first opening 232 configured to receive a combiner mirror 234. The combiner mirror 234 is connected to the combiner HUD body 210 by way of a combiner holder 236 having holder arms 235, 237. The combiner mirror 234 is movable between the stowed position as shown in FIG. 2A and the deployed position as shown in FIG. 2B about the combiner holder 236. The combiner mirror 234 includes an inner surface 234a facing the bottom side 214 when in the stowed position and having a mirror angle β with respect to the fore-aft axis X when in the deployed position (FIG. 2B). The inner surface 234a of the combiner mirror 234 is used as a mirror for the information instead of using the windshield itself. In some examples, the inner surface 234a of the combiner mirror 234 includes a transparent plastic disc used as the mirror.

In some implementations, the combiner HUD system 200 includes one or more mounting tabs 238 extending away from at least one of the bottom side 214, the front side 216, the back side 218, the left side 220, or the right side 222. The mounting tabs 238 are configured to mount and support the combiner HUD system 200 in the dashboard 104 of the vehicle 100. The mounting tabs 238 may be arranged at any of the various side portions 212-222 on the combiner HUD body 210. In some examples, each mounting tab 238 defines a void 240 configured to receive a bolt (not shown) attaching the combiner HUD system 200 to the vehicle 100.

The combiner HUD system 200 includes a first knob 250 and a second knob 260. The first and second knobs 250, 260 are substantially opposed along the fore-aft axis X. In some examples, the first knob 250 is positioned on the right portion R of the combiner HUD system 200, while the second knob 260 is positioned on the left portion L of the combiner HUD system 200, as shown. In other examples, the first knob 250 is positioned on the left side L of the combiner HUD system 200, while the second knob 260 is positioned on the right side R of the combiner HUD system 200 (not shown). In yet other examples, both the first and second knobs 250, 260 are positioned on one of the left or right sides L, R of the combiner HUD system 200. As such, the first and second knobs 250, 260 may be positioned in such a way to allow the driver 10 to rotate the knobs 250, 260.

The first and second knobs 250, 260 may releasably connect to the combiner HUD body 210. In some examples, the first knob 250 includes an elevation knob. As shown, the first knob 250 is positioned inside the combiner HUD body 210 adjacent the right side 222 (or the left side 218) and extends from a first knob opening 232a defined by the top side 212 of the combiner HUD body 210 away from the top side 212. The first knob 250 is configured to rotate in a forward F direction or in a rearward R direction.

In some implementations, the second knob 260 includes a fine adjustment knob that allows the driver 10 to adjust the combiner mirror 234 based on a position of the head of the driver 10. As shown, the second knob 260 is positioned inside the combiner HUD body 210 adjacent the left side 220 (or the right side 220) and extends from a second knob opening 232b defined by the top side 212 away from the top side 212. The second knob 260 is configured to rotate in a forward F direction or in a rearward A direction.

In some examples, the first and/or second knob 250, 260 may have a knurled outer surface 251, 261 that facilitates rotation of the knobs 250, 260 by hand, e.g., a thumb or finger. A knurled outer surface 251, 261 may include a pattern of straight, angled, or crossed lines that are cut or rolled into the material of the knobs 250, 260.

Figure 3A:
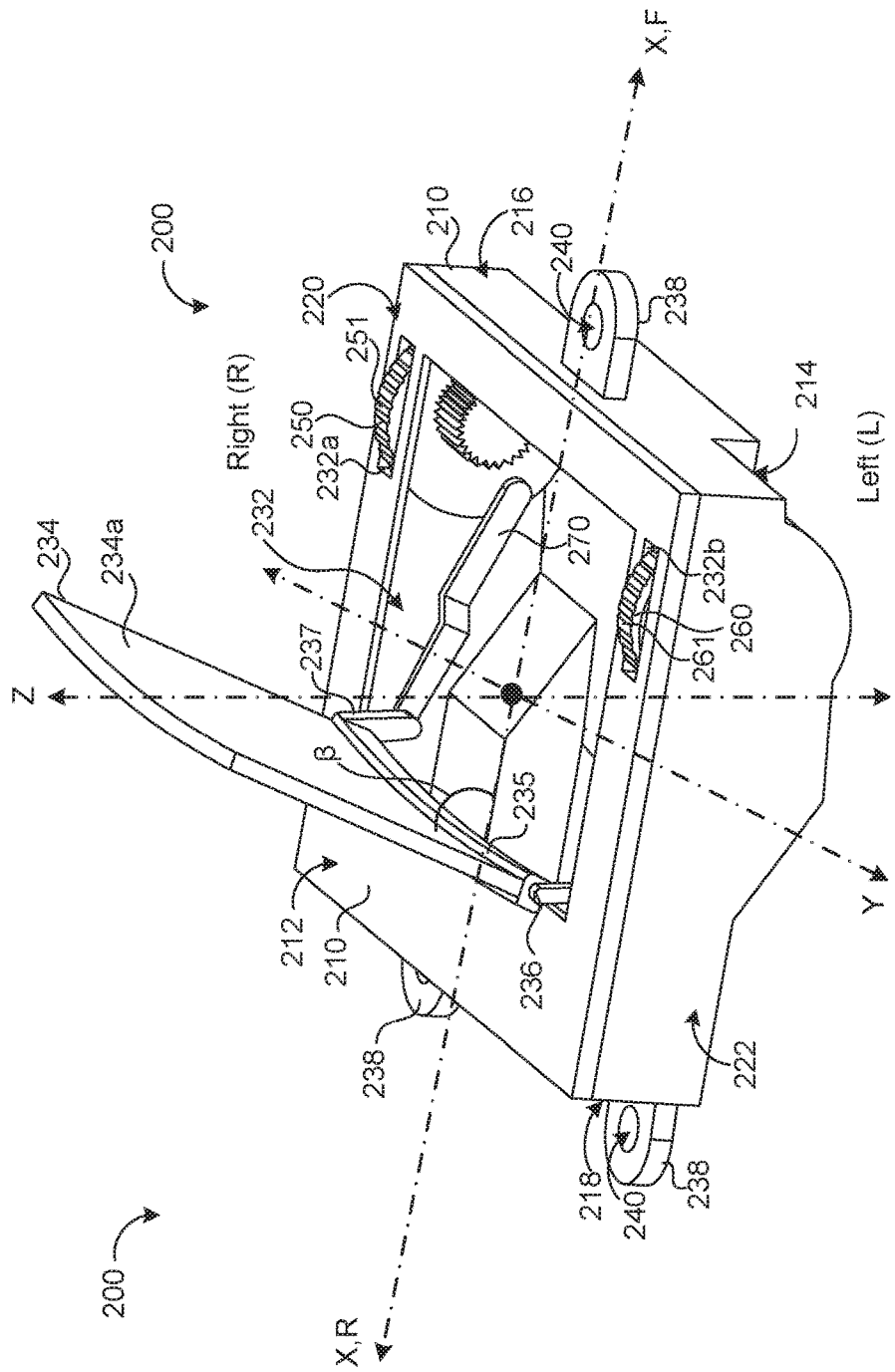
FIG. 3A is a perspective view of the exemplary combiner HUD system in a display position including an elevation knob.
Figure 3B:
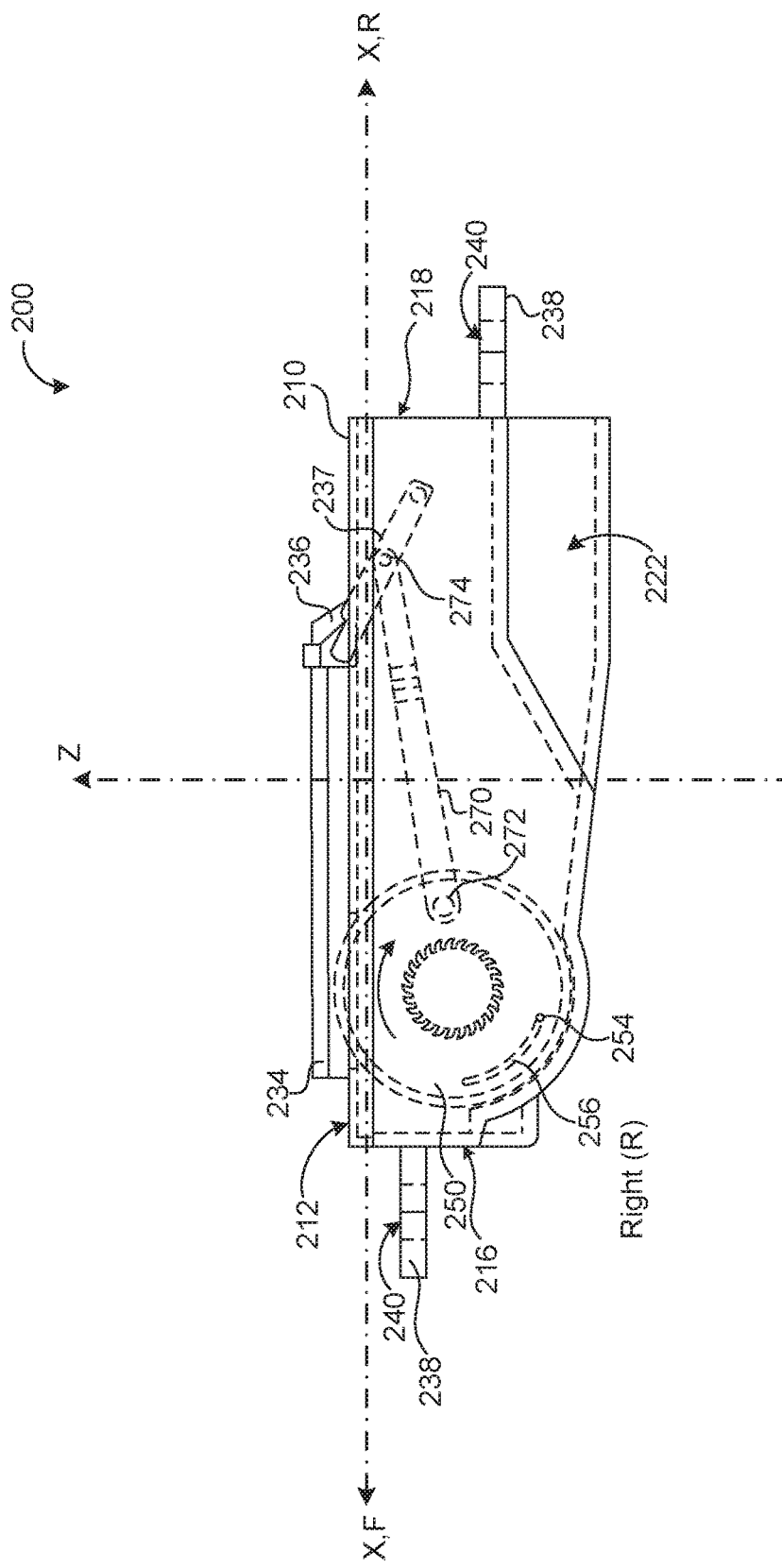
FIG. 3B is a side view of the exemplary combiner HUD system in a stowed position including an elevation knob.
Figure 3C:
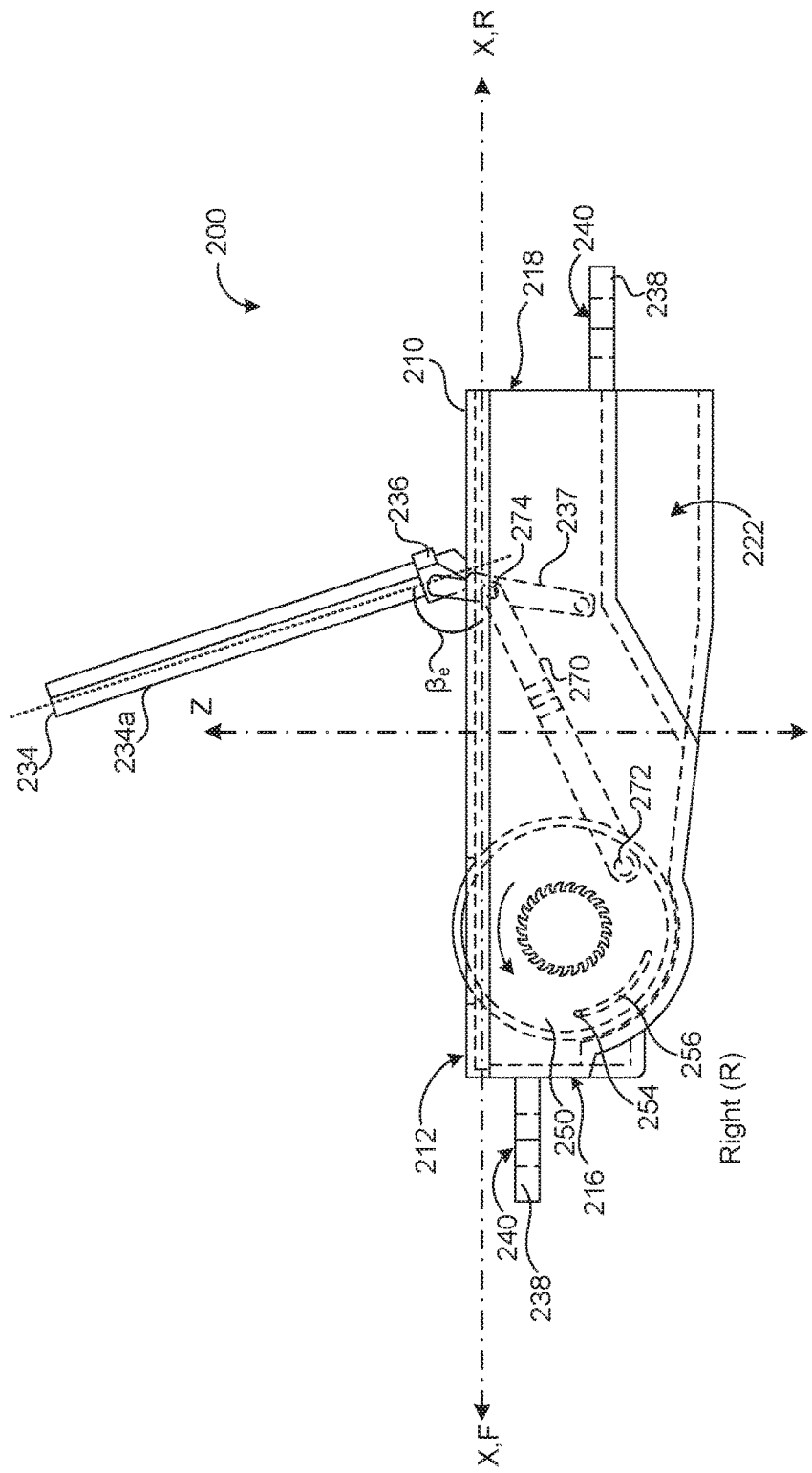
FIG. 3C is a side view of the exemplary combiner HUD system in a display position including an elevation knob.

Referring to FIGS. 3A-3C, the first knob 350 includes an elevation knob, as such, the first knob 250 is configured to elevate the combiner mirror 234 from the stowed position (FIG. 3B) to a deployed position (FIGS. 3A and 3C). In some implementations, the first knob 250 is releasably connected to an elevation link 270 by way of a first pin 272. In some examples, the pin 272 is part of the first knob 250 and the elevation link 270 is releasably connected to the pin 272, for example, the elevation link 270 defines a pin holder (not shown) for receiving the pin 272 of the first knob 250.

In other examples, the pin 272 is part of the elevation link 270 and is inserted in a pin holder (not shown) defined by the first knob 250.

In some examples, the combiner holder 236 includes an elevation arm 237. The elevation link 270 is connected to the elevation arm 237 by way of a second pin 274. As such, when the combiner HUD system 200 is in the stowed position, the driver 10 may rotate the first knob 250 in a rearward direction R, for example, resulting in the elevation link 270 pulling the elevation arm 237 in a forward direction F causing the combiner mirror 234 to change from the stowed position into the deployed position as shown in FIG. 3C. In some examples, the driver 10 may rotate the first knob 250 about a fifth of a turn in the rearward direction R, e.g., a quick elevation.

When the combiner HUD system 200 is in the deployed position, the driver 10 may rotate the first knob 250 in a forward direction F, i.e., in a direction towards the driver 10, for example, resulting in the elevation link 270 pushing the elevation arm 237 in a rearward direction R causing the combiner mirror 234 to change from the deployed position to the stowed position as shown in FIG. 3B. In some examples, the driver 10 may rotate the first knob 250 about a fifth of a turn in the forward direction F, e.g., a quick de-elevation. When in the deployed position, the combiner mirror 234 forms an elevation angle βe between the mirror 234 and the fore-aft axis X. In some examples, the elevation angle β between 50-60 degrees. The elevation angle β may be adjustable to other ranges as well.

As described, when the combiner HUD system 200 is in a stowed position a rearward movement R of the first knob 250 changes the combiner HUD system 200 to a deployed position. In addition, when the combiner HUD system 200 is in the deployed position, a forward movement F of the first knob 250 changes the combiner HUD system 200 to a stowed position. However, in other examples, when the combiner HUD system 200 is in a stowed position, a forward movement F of the first knob 250 changes the combiner HUD system 200 to a deployed position. In this case, when the combiner HUD system 200 is in the deployed position, a rearward movement R of the first knob 250 changes the combiner HUD system 200 to a stowed position.

In some examples, to limit the first knob 250 from moving outside the range of the stowed position or the deployed position, a first locking pin 254 is used to limit the range of motion of the first knob 250 and to maintain the position of the elevation link 270 to keep the combiner mirror 234 in the stowed position. The locking pin 254 is received by a locking trough 256 that together with the locking pin 254 is configured to restrict the motion of the first knob 250. As such, when the combiner HUD system 200 is in the stowed position due to the driver 10 rotating the first knob 250 in the forward direction F, the locking pin 254 and the locking trough 256 restrict the driver 10 from further rotating the first knob 250 in the forward direction F. Similarly, when the combiner HUD system 200 is in the deployed position due to the driver 10 rotating the first knob 250 in the rearward direction R, the locking pin 254 and the locking trough 256 restrict the driver 10 from further rotating the first knob 250 in the rearward direction R.

In some examples, the first locking pin 254 extends away from an inner surface of the first knob 250 into the locking trough 256 defined by an inner side of the right side 222 of the combiner HUD body 210. As discussed, the first locking pin 254 and the restriction through 256 are used as a restriction mechanism; however, other restriction mechanisms may also be used. For example, the first locking pin 254 extends away from the inner side of the right side 222 while the trough 256 defined by the first knob 250.

Figure 4A:
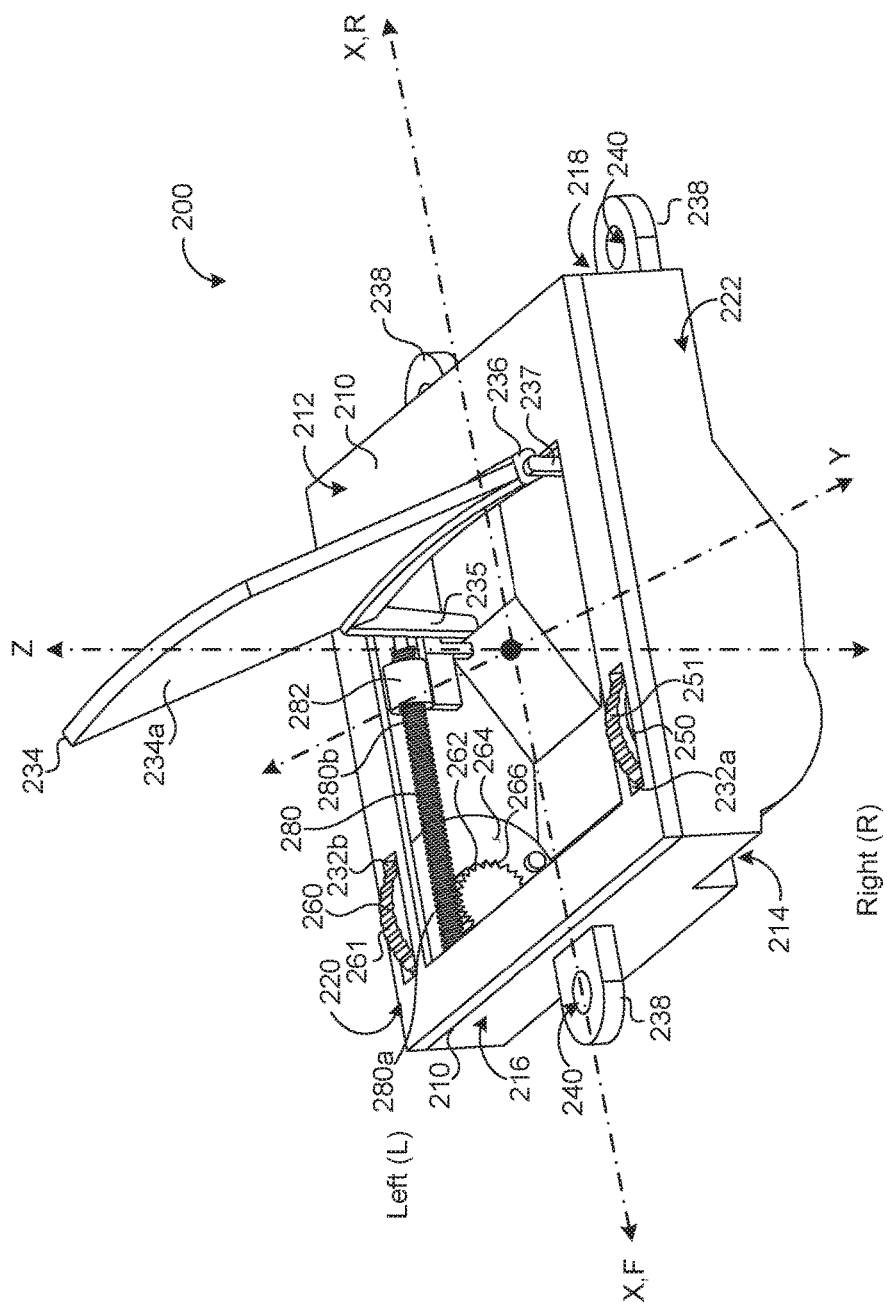
FIG. 4A is a perspective view of the exemplary combiner HUD system in a display position including a fine tuning knob.
Figure 4C:
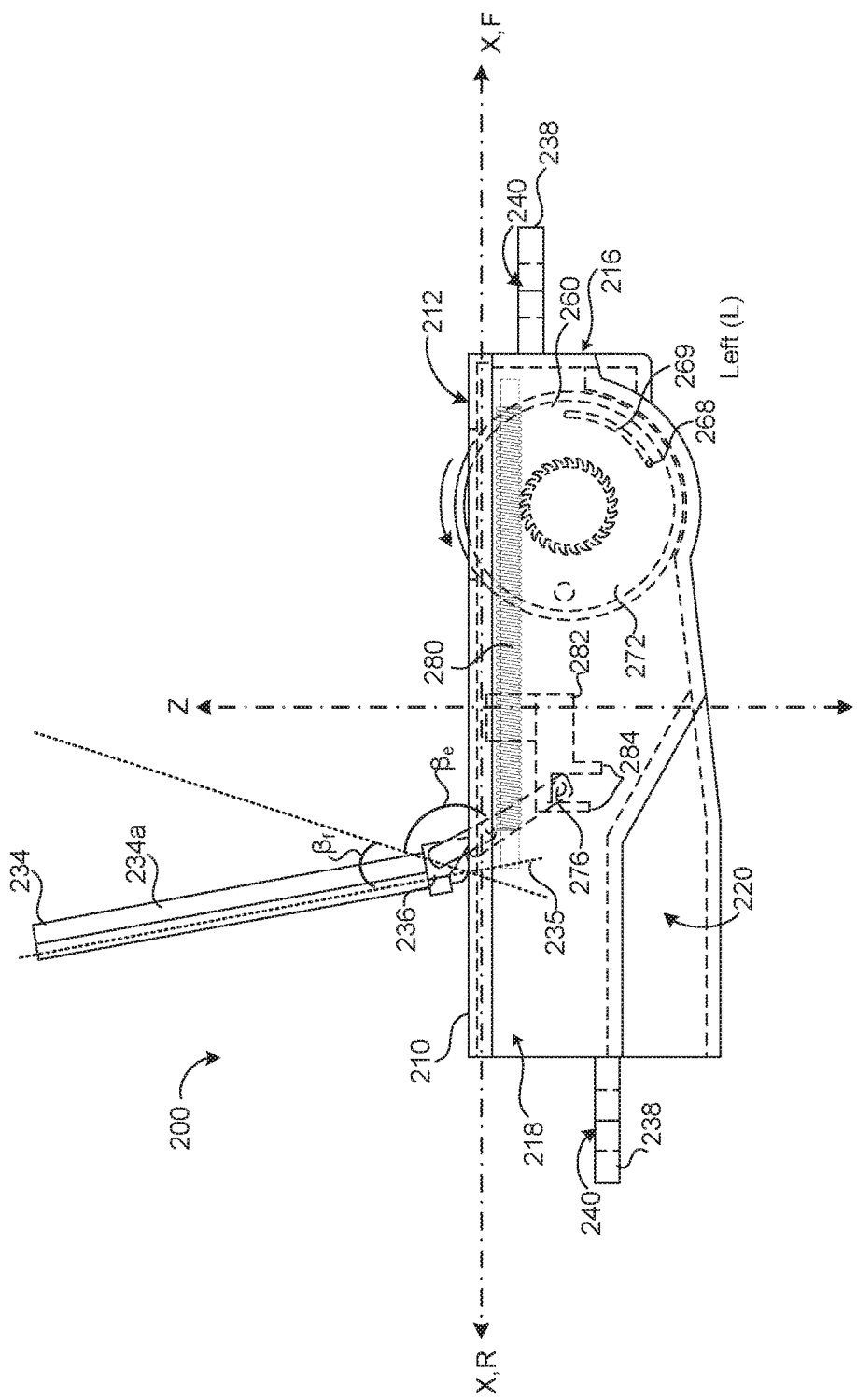
FIG. 4C is a side view of the exemplary combiner HUD system in a display position including a fine tuning knob.

Referring to FIGS. 4A-4C, in some implementations, after the driver 10 elevates the combiner mirror 234 to a display position using the first knob 250, the driver 10 may need to fine tune the position of the combiner mirror 234. In this case, the driver 10 may use the second knob 260 to fine tune the position of the combiner mirror 234 and adjust the combiner mirror 234 based on the position of the driver 10 with respect to the combiner mirror 234.

Referring to FIG. 4A, in some examples, the second knob 60 includes a neck 262 protruding from an inner surface 264 of the second knob 260. In some examples, the neck 262 defines a neck diameter that is less than a diameter of the second knob 260. The neck 262 includes an outer surface 266 about the diameter of the neck having cut teeth or cogs.

Referring back to FIGS. 4A-4C, the combiner HUD body 210 includes a threaded rod 280 having first and second ends 280a, 280b. The first end 280a of the threaded rod 280 is configured to mesh with the outer surface 261 of the neck 262. The second end 280b of the threaded rod 280 is releasably connected to a fine positioning slider 282.

In some example, the combiner holder 236 includes a fine tuning arm 235 configured to allow fine tuning of the position of the combiner mirror 234. The fine tuning arm 235 includes a tuning pin 276 positioned at a distal end of the fine tuning arm 235 extending away from the combiner holder 236. The fine positioning slider 282 includes a U-shaped hook 284 configured to receive the tuning pin 276 when the combiner mirror 234 moves from the stowed position to the deployed position. As such, the driver 10 may fine tune the combiner mirror 234 by rotating the second knob 260 in a forward direction F which causes the threaded rod to move in the forward direction F causing the fine positioning slider 282 to also move in the forward direction F. In this case, the U-shaped hook 284, being part of the fine positioning slider 282, also moved in the forward direction F, moving the tuning pin 276 along with it. The movement of the tuning pin 276 towards the forward direction F, causes the combiner mirror 234 to move in a rearward direction R to a maximum adjusted position as shown in FIG. 4C.

At an initial fine adjustment position shown in FIG. 4B, the elevation angle βe is at a maximum. However, when the driver 10 rotates the second tuning knob 260 to a maximum tuning position, the adjustment position of the combiner mirror 234 may increase by a fine tuning angle βf in addition to the elevation angle βe. In some examples, the fine tuning angle βf may be between 0-30 degrees. Other ranges may be used as well.

In some examples, to limit the second knob 260 from moving outside the range of the fine tuning angle βf, a second locking pin 268 is used to limit the range of motion of the second knob 260 and to maintain the position of the combiner mirror 234 and preventing it from moving back to a closed position. The second locking pin 268 is received by a restriction trough 269 that together with the locking pin 268 is configured to restrict the motion of the second knob 260. As such, when the combiner HUD system 200 is in the maximum elevation position, the second locking pin 268 and the restriction trough 269 restrict the driver 10 from rotating the second knob 260 in the rearward direction R. Similarly, when the combiner HUD system 200 is in the maximum adjustment position due to the driver 10 rotating the second knob 260 in the forward direction F, the locking pin 254 and the locking trough 256 restrict the driver 10 from further rotating the first knob 250 in the forward direction F.

In some examples, the second locking pin 268 extends away from an inner surface of the second knob 260 into the restriction trough 269 defined by an inner side of the left side 220 of the combiner HUD body 210. As discussed, the second locking pin 268 and the restriction through 269 are used as a restriction mechanism; however, other restriction mechanisms may also be used. For example, the second locking pin 268 extending away from the inner side of the left side 220 and into the trough 269 defined by the second knob 260.

A number of implementations have been described. Nevertheless, it will be understood that various modifications may be made without departing from the spirit and scope of the disclosure. Accordingly, other implementations are within the scope of the following claims.

What is claimed is:

1. A combiner head-up display (HUD) system comprising:
   a combiner mirror;
   a combiner holder configured to support the combiner mirror, the combiner holder including a first holder arm and a second holder arm;
   a combiner HUD body defining a fore-aft axis extending between a left portion and a right portion of the combiner HUD body;
   a first knob supported by the combiner HUD body;
   an elevation link connecting the first knob and the first holder arm, wherein a rotation of the first knob causes the combiner mirror to move from a stowed position to a display position or from a display position to a stowed position;
   a second knob supported by the combiner HUD body and disposed substantially opposite the first knob about the fore-aft axis; and
   a threaded rod connecting the second knob and the second holder arm, wherein when the combiner mirror is in the display position, a rotation of the second knob causes the combiner mirror to adjust a display angle between the fore-aft axis and the combiner mirror.

2. The combiner HUD system of claim 1, wherein the combiner mirror comprises an inner surface including a transparent plastic disc.

3. The combiner HUD system of claim 1, wherein the first and second knobs each include a knurled outer surface.

4. The combiner HUD system of claim 1, further comprising a pin disposed at a distal end of the second holder arm.

5. The combiner HUD system of claim 4, further comprising a fine positioning slider disposed at a distal end of the threaded rod, the fine positioning slider defining a U-shaped hook configured to receive the pin of the second holder arm when the combiner mirror is in the display position.

6. The combiner HUD system of claim 1, further comprising a first restriction mechanism configured to restrict a motion of the first knob and a second restriction mechanism configured to restrict a motion of the second knob.

7. The combiner HUD system of claim 6, wherein the first and/or second restriction mechanism comprises a pin disposed at an inner side of the combiner HUD housing and a trough disposed on the first and/or second knob, the trough is configured to restrict the motion of the pin as it rotates with the first and/or second knob.

8. The combiner HUD system of claim 6, wherein the first and/or second restriction mechanism comprises a trough disposed at an inner side of the combiner HUD housing and a pin disposed on the first and/or second knob, the pin is configured to restrict the motion of the trough as it rotates with the first and/or second knob.

* * * * *